Dec. 17, 1946. R. W. LUCE 2,412,896

THREADED LOCKING DEVICE

Filed June 16, 1943

INVENTOR
RICHARD W. LUCE
BY
George T. Gill
ATTORNEY

Patented Dec. 17, 1946

2,412,896

UNITED STATES PATENT OFFICE 2,412,896

THREADED LOCKING DEVICE

Richard W. Luce, Southport, Conn.

Application June 16, 1943, Serial No. 491,023

2 Claims. (Cl. 151—21)

The invention herein disclosed relates to a threaded locking device of the kind in which a frictional force is set up between the thread of the device and the thread of an engaging element.

Threaded locking devices of this kind commonly include a part which, in its relation to the load-carrying threads, effects a frictional engagement between engaging threads. One form of such threaded locking device is that illustrated and described in my co-pending application, Ser. No. 322,650, filed March 7, 1940. In this lock-nut, there are two axially alined, threaded portions, normally held in out of phase relation by a resilient portion. When a bolt is entered in the nut, the resilient portion is expanded to bring the threads of both portions of the nut into coincidence with the thread of the bolt. This reacts to effect a locking force between the thread of a bolt and a thread of the nut.

An object of the invention is to provide a threaded locking device of the kind to which this invention relates that is of simple construction, inexpensive to manufacture and reliable in service.

A threaded locking device illustrating an example of one specific form of an embodiment of the invention is shown in the accompanying drawing in which.

Figure 1:
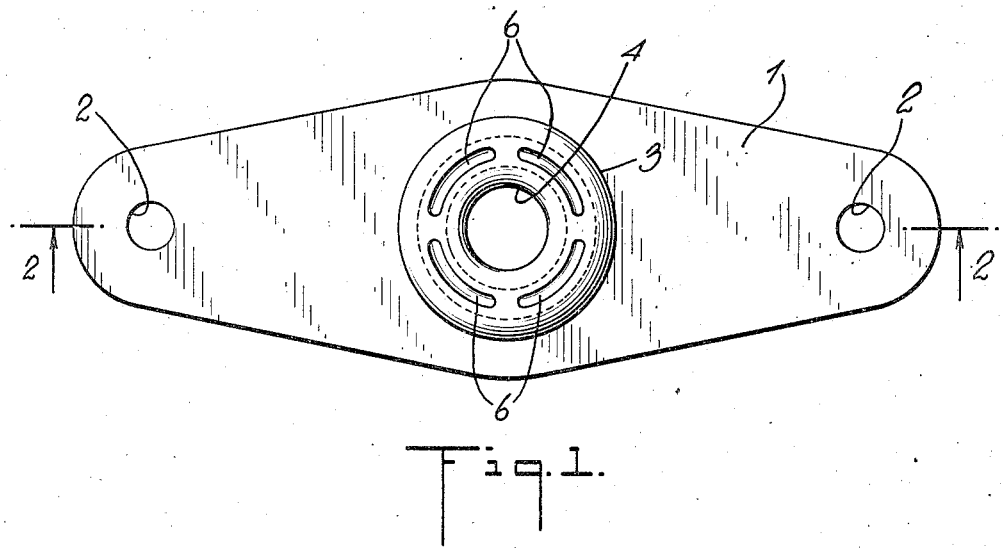
Fig. 1 is a plan view of the threaded locking device.
Figure 2:
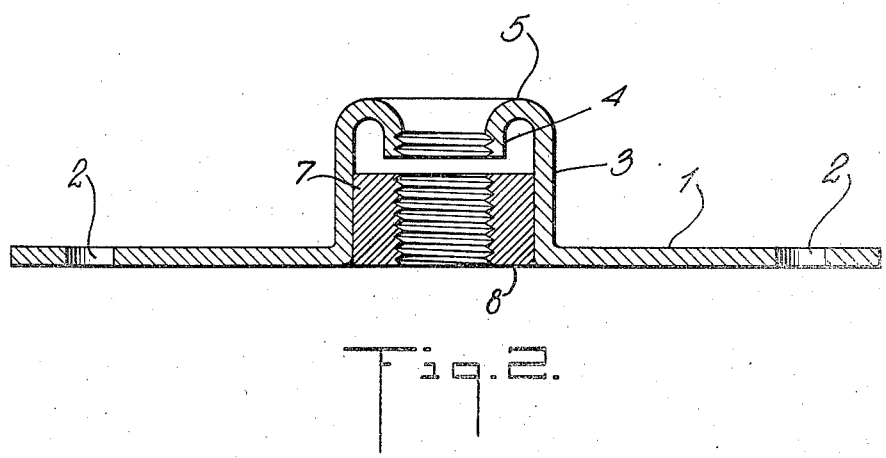
Fig. 2 is an axial section taken along the line 2—2 of Fig. 1.

The invention is illustrated in the drawing as it is embodied in an anchor nut and as applied to an all metal nut in which two alined threaded portions are normally maintained with the threads thereof out of phase. It is, however, to be understood that the invention may be embodied in other forms of nuts such as hex nuts and applied to different kinds of lock-nuts, such, for example, as the kind in which a resilient washer is used to effect the locking action.

An anchor nut such as that illustrated in the drawing is secured in place by being riveted to a structural element. So mounted it is secured against rotation and no wrenching faces are required. The nut illustrated comprises a flange 1 which has rivet openings 2 therethrough. This flange and a tubular element 3 are formed from sheet metal. The tubular element is drawn in the sheet metal and the end portion thereof is bent inwardly through an angle of substantially one hundred and eighty degrees to form an inturned cylindrical end portion 4 connected with the tubular portion by a resilient portion 5. To increase the resiliency of the resilient portion, or rather to decrease its resistance to bending, slots 6 may be formed therein.

The inner surface of the tubular element is copper plated and a body element 7, copper plated on the outer surface is inserted in the tubular element. These are made so that there is a press fit between them and the body element is inserted so that the end edge or surface 8 thereof is flush with the surface of the flange 1. The body element has a central opening therethrough of the same diameter as the internal diameter of the cylindrical end portion 4 formed on the tubular element. Both of the elements are made from heat treatable steel, preferably ten thirty-five S. A. E. steel classification.

After the body element has been inserted in the tubular element they are united by hydrogen brazing during which the temperature is raised to two thousand one hundred and fifty degrees Fahrenheit. Following the hydrogen brazing, the assembled elements are heat treated and then the body element and the cylindrical end portion 4 are tapped. The same tap is run through both so that a thread 9 is formed in the body element and a thread 10 of the same pitch is formed in the end portion 4 which is axially spaced from the body element. Thereafter, the nut is compressed so that the end portion 4 is positioned with the thread thereof out of phase with the thread of the body element in a direction towards the body element and in an amount slightly less than half the pitch of the thread.

From the foregoing description of the nut illustrated in the drawing it will be apparent to those skilled in the art that by this invention there is devised a simple inexpensive construction. For certain nut structures, such as those in which a resilient washer is used, the tubular member, with the end straight may first be united to the body member which is drilled and tapped. Then a resilient washer is inserted in the end of the tubular member which is then rolled or bent inwardly to form an inturned end portion.

It will be obvious that various changes may be made by those skilled in the art in the details of the embodiment of the invention illustrated in the drawing and described in detail above within the principle and scope of the invention as expressed in the appended claims.

I claim:

1. A threaded locking device of the kind described comprising in combination an internally threaded body element having the load-carrying thread therein, and a stamped and drawn tubular element consisting of a single piece of sheet metal and including a portion surrounding the body element, making a press fit therewith and brazed thereto, an axially extending end portion extending beyond one end of the body portion, an inturned, resilient portion extending inwardly from the end of the axially extending end portion and inturned through substantially one hundred and eighty degrees, and a portion extending axially from said inturned resilient portion and having a thread therein of like pitch as the thread of the body element and normally positioned with the thread thereof axially displaced out of phase with the thread of the body portion.

2. A threaded locking device of the kind described comprising in combination an internally threaded body element having the load-carrying thread therein, and a stamped and drawn tubular element consisting of a single piece of sheet metal and including a portion surrounding the body element, making a press fit therewith and brazed thereto, an axially extending end portion extending beyond one end of the body portion, an inturned, resilient portion having metal removed therefrom to increase the resiliency extending inwardly from the end of the axially extending end portion and inturned through substantially one hundred and eighty degrees, and a portion extending axially from said inturned resilient portion and having a thread therein of like pitch as the thread of the body element and normally positioned with the thread thereof axially displaced out of phase with the thread of the body portion.

RICHARD W. LUCE.